July 24, 1962     A. WITTLIN     3,046,097
FLUID INDICATOR
Filed Aug. 26, 1958
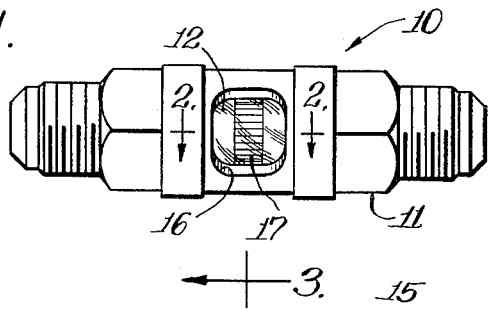
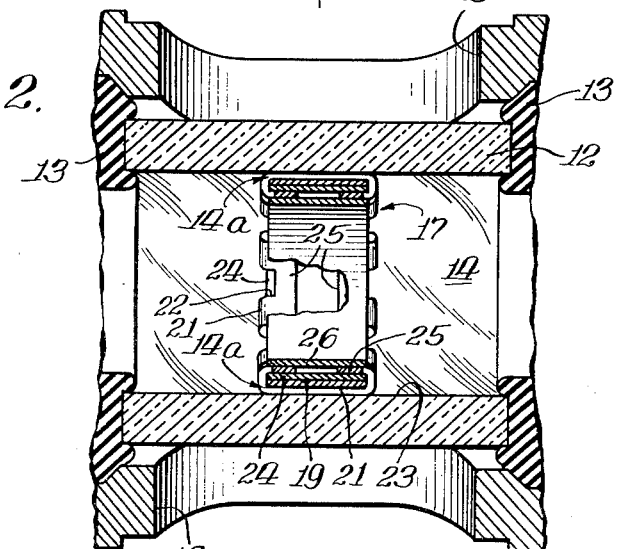
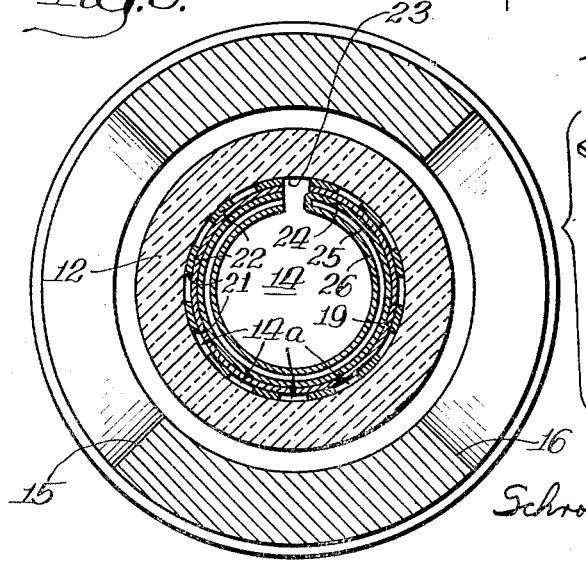
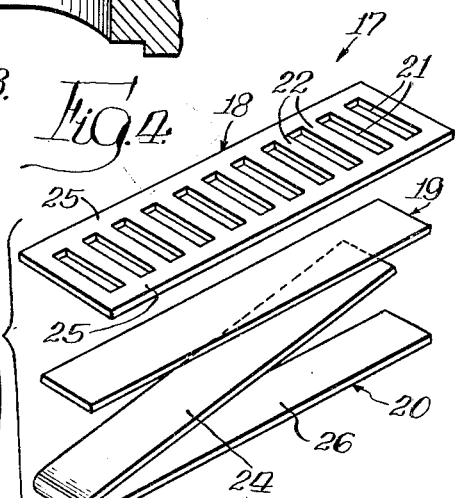
INVENTOR.
Albert Wittlin
BY Schroeder, Hofgren, Brady & Wegner
Attys.

United States Patent Office 3,046,097
Patented July 24, 1962

3,046,097
FLUID INDICATOR
Albert Wittlin, % Allin Manufacturing Co.,
410 N. Hermitage Ave., Chicago 22, Ill.
Filed Aug. 26, 1958, Ser. No. 757,237
4 Claims. (Cl. 23—253)

This invention relates to a fluid indicator and in particular to an indicator adapted to be inserted in a fluid line to permit determination of a condition of the fluid, such as a determination of the moisture condition thereof.

This application comprises a continuation-in-part of my co-pending application Serial No. 739,176, filed June 2, 1958, now Patent No. 2,976,124. The indicator structure disclosed and claimed herein comprises a further improvement in such a fluid indicator.

The principal feature of the instant invention is the provision of a new and improved fluid indicator for indicating the presence in a fluid of another substance.

Another feature is the provision of such a fluid indicator having improved simplified and economical indicating means.

Another feature is the provision of such a fluid indicator having new and improved means for effecting desirable contact of the fluid with the indicating means.

Other features and advantages of the invention will be apparent from the following description, taken in connection with the accompanying drawing, wherein:

FIG. 1 is an elevation of a fluid indicator embodying the invention;

FIG. 2 is an enlarged fragmentary section taken approximately along the line 2—2 of FIG. 1;

FIG. 3 is a transverse section taken approximately along the line 3—3 of FIG. 2; and FIG. 4 is an exploded view of the elements of the fluid indicator prior to the assembly thereof.

In the exemplary embodiment of the invention, as disclosed in the drawing, a fluid indicator generally designated 10 comprises a tubular protective member 11 having a transparent tube 12 sealingly secured in member 11 by suitable gaskets 13 to define a fluid flow passage 14. The protective member 11 is provided with a pair of opposed ports 15 and 16 which are aligned with tube 11 to permit the ready viewing of flow passage 14.

The above described structure is substantially similar to that of my co-pending application Serial No. 739,176. The instant invention comprehends an improved means, herein generally designated 17, disposed in passage 14 to provide an indication of the presence of another substance in the fluid flowing through passage 14. To illustrate the invention, we will assume that the fluid indicator 10 is arranged to indicate the presence of moisture in refrigerant fluid.

As best seen in FIG. 4, indicating means 17 comprises an outer member 18, an indicator strip 19, and a spring support 20. The three elements 18, 19 and 20 of the indicator means are juxtaposed in an annular assembly to define means 17, as best seen in FIGS. 2 and 3.

More specifically, outer member 18 comprises an elongated sheet of material, such as paper, having a plurality of slots 21 spaced longitudinally thereof, or transversely to the direction of fluid flow through passage 14. The lands 22 between slots 21 define a plurality of strips which are facially juxtaposed to the inner surface 23 of tube 12 defining passage 14.

Indicator strip 19 comprises an elongated sheet provided with a body of material having a color varying as a function of the presence of moisture in the refrigerant fluid. Illustratively, indicator strip 19 may be formed of paper impregnated with a cobalt salt such as cobaltous chloride. The width of indicator strip 19 is preferably slightly less than the length of slots 21, as best seen in FIG. 2.

Spring support 20 comprises a bifurcated, or folded, leaf spring formed of a resilient material such as copper. One leg 24 of spring support 20 is juxtaposed to the underside of indicator strip 19 and is substantially coextensive therewith. The lateral edges 25 of outer member 18 are inturned under leg 24 of spring support 20, as best seen in FIG. 2, and are retained clampedly thereagainst by the other leg 26 of the spring support.

Slots 21 extend fully across indicator strip 19 to define a plurality of small flow passage portions 14a through which the refrigerant fluid may pass between indicator strip 19 and inner surface 23 of the tube 12. Thus, the refrigerant fluid continuously washes against the outer surface of the indicator strip to maintain the surface of the strip clean and assure a relatively rapid response to changes in the moisture level in the refrigerant fluid. Further, the slots 21 preferably extend substantially straight and parallel to the axis of means 17 (and, thus, are aligned with the flow direction through passage 14) to facilitate flow of the refrigerant fluid therethrough.

To facilitate an accurate determination of the color of indicator strip 19 indicating the presence of moisture in the refrigerant fluid, outer member 18 may be arranged to have a color corresponding to a predetermined color of the indicator strip. More specifically, in the illustrated embodiment, outer member 18 is dyed, as with an oil fast dye, to correspond to the color of the indicator strip 19 indicating a dry condition of the refrigerant fluid. To increase the accuracy of the color comparison determination, the texture of outer member 18 is preferably similar to the texture of the indicator strip 19 whereby a precise matching of the appearance of the outer member and the dry indicator strip may be effected.

In use, indicating means 17 is installed within transparent tube 12 in alignment with the mid-portion of ports 15 and 16 to be readily viewable therethrough, as best seen in FIG. 1. The biasing action of spring support 20 causes the indicating means to be retained securely in the aligned position against the dislodging tendency of the refrigerant fluid flowing through passage 14. As a portion of the refrigerant fluid may flow readily through the small flow passages 14a adjacent the inner surface 23 of tube 12, the exposed portions of indicator strip 19 provide an immediate and accurate indication of the moisture content of the refrigerant fluid. As the reference color standard provided by the dyed outer member 18 is immediately adjacent the indicator strip, a highly accurate comparison may be readily effected. As indicating means 17 is radially thin, resistance to flow of the refrigerant fluid through passage 14 is effectively minimized. Further, as indicating means 17 comprises three simply constructed elements, namely outer member 18, indicator strip 19 and spring support 20, which are readily assembled and installed as a unit in passage 14, not only does fluid indicator 10 provide an improved functioning, but provides also a highly desirable economy of manufacture.

While I have shown and described certain embodiments of my invention, it is to be understood that it is capable of many modifications. Changes, therefore, in the construction and arrangement may be made without departing from the spirit and scope of the invention as defined in the appended claims.

I claim:
1. In a fluid indicator having a flow passage bounded at one portion by transparent means permitting the viewing of the interior thereof, and means in said passage for indicating the presence of another substance in the fluid, including a sheetlike arrangement of material having an appearance varying as a function of the presence of said another substance in the fluid, and spring means biasing said sheetlike arrangement of material outwardly toward the transparent means, spacing means comprising a plurality of elements between said sheetlike arrangement of material and the transparent means and spaced transversely to the direction of fluid flow through the passage to form a plurality of flow passage portions adjacent the transparent means, each of said elements extending fully across said sheetlike arrangement in the direction of fluid flow so that the opposite ends of said passage portions are open to said fluid flow passage whereby a portion of a fluid flowing through said fluid flow passage flows through said passage portions, said spacing means being defined by a sheet member having a plurality of parallel, spaced rectangular openings, the lands between said openings defining said elements.

2. In a fluid indicator having a flow passage bounded at one portion by transparent means permitting the viewing of the interior thereof, and means in said passage for indicating the presence of another substance in the fluid, including indicating means inwardly spaced adjacent said transparent means to be contacted by fluid passing through said passage portions and providing a variable appearance as a function of the presence of another substance in the fluid, and a spring support urging the indicating means toward said transparent means, spacing means comprising an outer member having a plurality of elements extending fully across the indicating means in the direction of fluid flow through the passage and defining a plurality of slots spaced transversely to the direction of fluid flow through the passage to form a plurality of small flow passage portions between said indicating means and said transparent means, the opposite ends of said passage portions being open to said fluid flow passage whereby a portion of a fluid flowing through said fluid flow passage flows through said passage portions.

3. The fluid indicator of claim 2 wherein said outer member is provided with opposite edge portions arranged to be inturned under said spring support whereby said outer member and spring support co-operatively envelop said indicating means.

4. In a fluid indicator including an indicating member having an outer surface juxtaposed to a transparent viewing element, a spacer between said member and element comprising a thin sheet having a plurality of uniformly spaced portions each having a uniform cross section and extending fully across said outer surface.

References Cited in the file of this patent

UNITED STATES PATENTS

| | | |
|---|---|---|
| 1,103,985 | Murray | July 21, 1914 |
| 1,444,103 | Boyd | Feb. 6, 1923 |
| 2,214,109 | Ott | Sept. 10, 1940 |
| 2,600,148 | Wittlin | June 10, 1952 |
| 2,624,308 | Wittlin | Jan. 6, 1953 |
| 2,725,844 | Wittlin | Dec. 6, 1955 |
| 2,744,488 | Wittlin | May 8, 1956 |
| 2,757,632 | Wittlin | Aug. 7, 1956 |
| 2,785,057 | Schwab | Mar. 12, 1957 |
| 2,843,078 | Wittlin | July 15, 1958 |
| 2,844,026 | Wischmeyer | July 22, 1958 |

FOREIGN PATENTS

| | | |
|---|---|---|
| 284,120 | Great Britain | Jan. 26, 1928 |